No. 764,175. PATENTED JULY 5, 1904.
W. H. BRISTOL.
THERMO ELECTRIC COUPLE.
APPLICATION FILED MAR. 5, 1904.
NO MODEL. 2 SHEETS—SHEET 1.
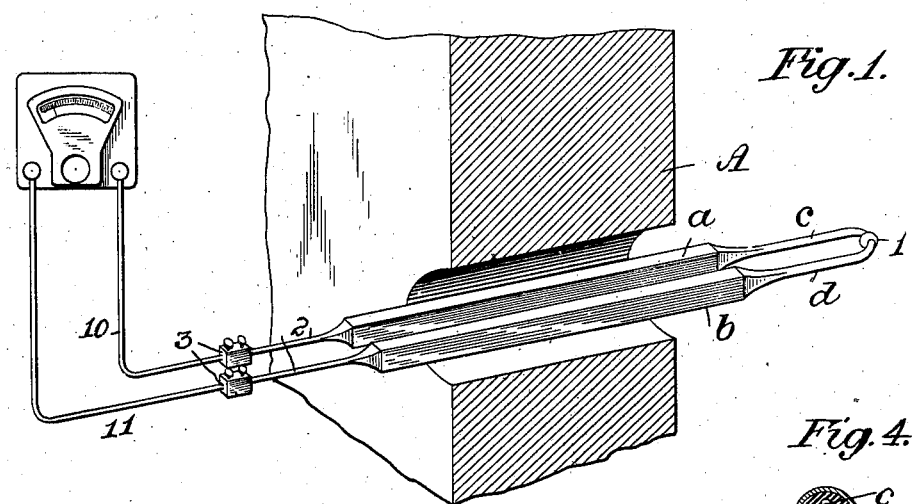
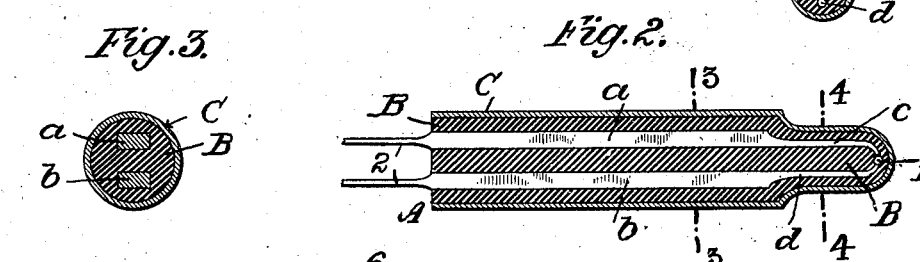
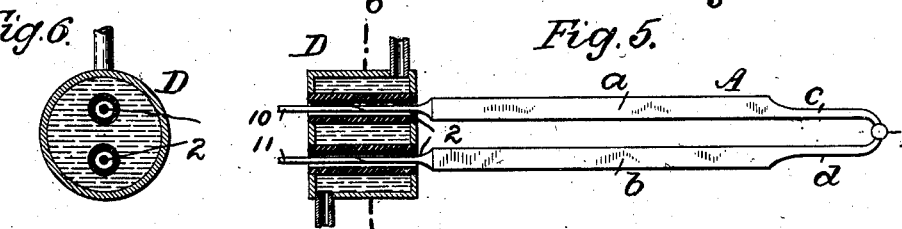
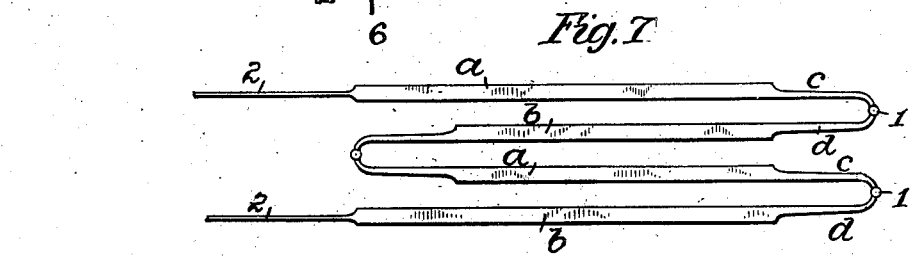
Witnesses
Inventor: William H. Bristol
By his Attorney No. 764,175. PATENTED JULY 5, 1904.
W. H. BRISTOL.
THERMO ELECTRIC COUPLE.
APPLICATION FILED MAR. 5, 1904.
NO MODEL. 2 SHEETS—SHEET 2.

WITNESSES:
Wm J. Donnelly
Raena H. Yudisky

INVENTOR:
William H. Bristol
BY
A. Faber du Faur Jr.
ATTORNEY.

No. 764,175. Patented July 5, 1904.

UNITED STATES PATENT OFFICE.

WILLIAM H. BRISTOL, OF HOBOKEN, NEW JERSEY.

THERMO-ELECTRIC COUPLE.

SPECIFICATION forming part of Letters Patent No. 764,175, dated July 5, 1904.

Application filed March 5, 1904. Serial No. 196,739. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Thermo-Electric Couples, of which the following is a specification.

My invention has reference to thermo-electric couples and thermic batteries, and particularly to elements adapted for use in instruments for measuring high temperatures—such, for instance, as pyrometers of that class which determine temperatures from the measures of the strength of thermo-electric currents produced by heating the junction of two different metals or metal alloys.

The object of my invention is to render the couple extremely sensitive to changes in temperature at the junction, while providing for an increased conductivity of the elements along their shanks for the purpose of reducing the resistance due to changes in temperature which occur along the length of the shanks of the elements.

To this end my invention consists, essentially, in a thermo-electric couple having its elements reduced in cross-section at and adjoining their junction, the shanks of the elements being of comparatively large conductive area.

The nature of my invention will best be understood when described in connection with the accompanying drawings, in which—

Figure 8:
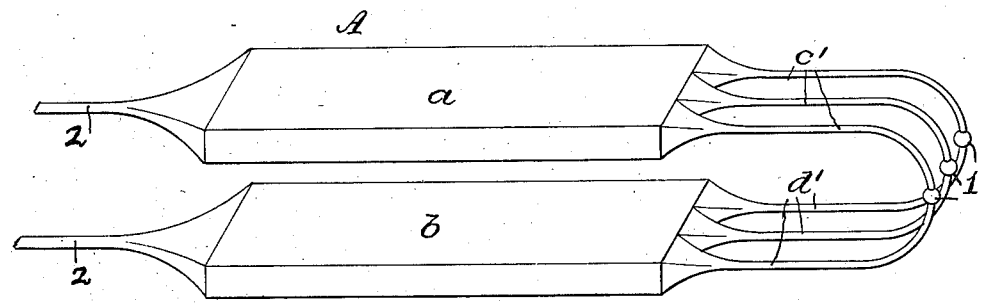
Figure 9:
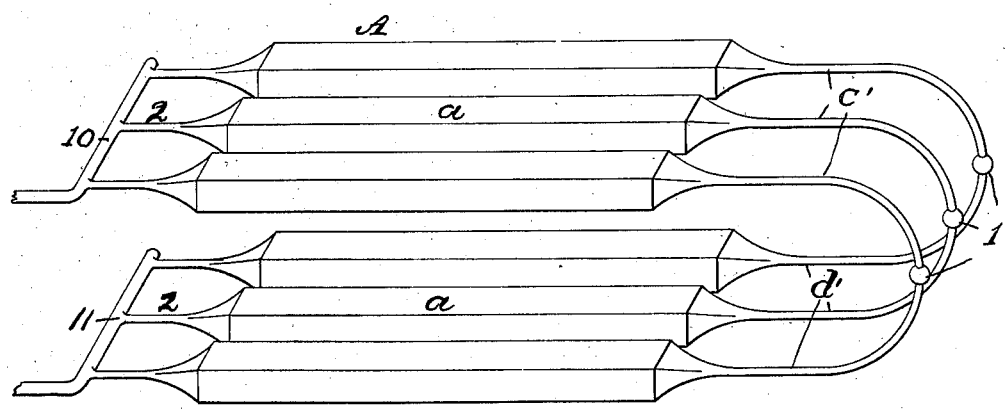

Figure 1 represents a perspective view of a thermo-electric couple used as a pyrometer and applied to a furnace. Fig. 2 is a longitudinal section showing the couple provided with a protective insulating material for the same. Fig. 3 is a transverse section on the line 3 3, Fig. 2. Fig. 4 is a similar section on the line 4 4, Fig. 2. Fig. 5 is a plan or top view of a couple provided with means for cooling its outer or cold ends. Fig. 6 is a section on the line 6 6, Fig. 5. Fig. 7 is a plan view showing a number of couples united to form a thermic pile or battery. Fig. 8 is a perspective of a modified form for the pyrometer, and Fig. 9 is a like view of another modified form.

Similar letters and numerals of reference designate corresponding parts throughout the several views of the drawings.

Referring at present to Fig. 1 of the drawings, the letter A designates a thermo-electric couple of which the shanks $a$ and $b$ are of an enlarged cross-section, so as to permit of the passage of the current generated at a low voltage with comparatively small resistance, and $c$ and $d$ are the reduced portions of the elements extending from said shanks and united at 1 in a usual manner. These reduced portions of the elements adjoining the junction render the couple more sensitive to changes of temperature for an obvious reason, while the enlarged shanks comparatively reduce the resistance due to changes of temperature occurring along the length of the said elements, it being understood that with the metals usually employed the resistance increases with increase of temperature, and vice versa.

According to my invention I provide a couple which at its junction and parts adjoining thereto is rendered extremely sensitive to changes in temperature, while the conductivity of the elements is not influenced to any appreciable extent by changes in temperature.

In practice I prefer to reduce the outer or cold ends of the elements, as at 2 2, for the purpose of causing their temperature to be quickly influenced, so as to be easily maintained at a substantially constant temperature. The ends 2 of the elements are connected by usual means, such as the couplings 3 3, with wires 10 and 11, leading to a galvanometer or other electrical indicating or recording or measuring instrument.

In order to prevent too rapid oxidation of the ends of the couples exposed to the fire and also to keep the elements insulated from each other, I provide means as follows: The shanks $a$ and $b$, as well as the junction and adjoining portions $c$ and $d$, are embedded in a refractory non-conducting material, such as B, which surrounds said parts, and in practice this insulating and protecting material is reduced in thickness at and about the reduced portions $c$ and $d$, adjoining the junction 1, substantially in proportion to the difference in cross-section between said latter parts and the shanks $a$ and

*b*, thus preserving the sensitiveness of the couple to changes of temperature at the junction. This insulating and protecting material or covering may consist of asbestos, clay, porcelain, or other like material. In some instances, as when the couple is immersed into a bath of molten metal, I prefer to provide, in addition to the protective insulation, a sheathing C, of iron or like metal, or the protective insulation may be coated with graphite or other coating which will withstand the intense heats and serve as an additional protection for the insulating protective coating. The outer or cold ends of the couple may be maintained at substantially constant temperature by usual jackets D, as shown in Fig. 5, through which a circulation of air, water, or steam is maintained by usual means. Of course the cold ends must be insulated from the jacket or the cooling fluids, so as not to ground the elements.

In the couples described the material of the elements is presumed to be of comparatively low price—such, for instance, as elements made, respectively, of steel and nickel, which will withstand the comparatively high temperature required for a large variety of commercial uses—as, for instance, the tempering of steel in lead-baths.

The construction as described enables me to provide at a low cost a thermo-electric couple adapted for most of the purposes for which heretofore the expensive platinum and platinum-alloys were employed.

While I have herein described my invention embodied in one couple, it is of course to be understood that a series of couples could be united in the form of a thermic pile or battery, as shown in Fig. 7.

In order to further increase the sensitiveness of the couple to changes in temperature—as, for instance, when embodied in a pyrometer—I make use of the construction shown in Fig. 8, wherein the reduced portion of the couple is subdivided into a number of parts *c' d'* of an aggregate area of cross-section the same as that of the reduced portions *c* and *d* of the form shown in Fig. 1 or less than the area of cross-section of the shanks *a* and *b*. It will be readily understood that the individual parts *c' d'*, being of less area than the parts *c d* in cross-section, will heat and cool more quickly, and consequently respond more promptly to changes in temperature. In this latter construction the couples at the reduced ends are in parallel, and consequently the electromotive force remains the same as that obtained by the construction shown in Fig. 1, while, however, if the aggregate area of cross-section of the reduced ends is greater than the cross-section of the reduced ends in Fig. 1 less resistance is offered at the reduced ends without affecting the sensitiveness of the instrument in the same degree as it would affect the construction shown in Fig. 1. In other words, the resistance of the couple as a whole is decreased without material loss of sensitiveness, which could not be done with a single reduced end.

It is of course to be understood that a number of couples of the construction shown in Fig. 1 could be placed together side by side to form a compound couple similar to that shown in Fig. 8, but having separate shanks instead of one shank common to all the reduced ends.

The several couples would be united at their ends to common leads or conductors, and the effect would be the same as that of the construction shown in Fig. 8. In Fig. 9 I have illustrated this construction.

What I claim as new is—

1. A thermo-electric couple having its elements reduced in cross-section at and near their junction for causing the couple to quickly respond to changes in temperature, substantially as described.

2. A thermo-electric couple having its elements reduced in cross-section at and near their junction and having its shanks of large conducting area, substantially as described.

3. A thermo-electric couple having its elements reduced in cross-section at and near their junction and having their cold ends reduced in cross-section, substantially as described.

4. A thermo-electric couple having its elements reduced in cross-section at and near their junction and having their cold ends reduced in cross-section, and means for cooling said cold ends, substantially as described.

5. A thermo-electric couple having its elements reduced in cross-section at and near their junction and having their cold ends reduced in cross-section, and means for establishing a fluid circulation about the cold ends of the elements, substantially as described.

6. A thermo-electric couple having its elements reduced in cross-section at and near their junction and having its shanks of large conducting area, combined with means for establishing a fluid circulation about the cold ends of said elements, substantially as described.

7. A thermo-electric couple having its elements reduced in cross-section at and near their junction, and having its shanks of large area, combined with a protective insulating material, surrounding said elements, substantially as described.

8. A thermo-electric couple having its elements reduced in cross-section at and near their junction, and having its shanks of large area, combined with a protective insulating material surrounding said elements, and reduced proportionately in thickness at the reduced portions of the elements, substantially as described.

9. A thermo-electric couple having its elements reduced in cross-section at and near their junction, and having its shanks of large area, combined with a protective insulating material surrounding said elements, and a sheathing forming a protection for said insulating material, substantially as described.

10. A thermo-electric couple having its elements reduced in cross-section at and near their junction, and having its shanks of large area, combined with a protective insulating material surrounding said elements, and reduced proportionately in thickness at the reduced portions of the elements, and a sheathing forming a protection for said insulating material, substantially as described.

11. A thermo-electric couple having shanks of comparatively large area and a plurality of joined ends of aggregate area of cross-section smaller than that of the area of cross-section of the shanks, substantially as described.

12. A thermo-electric couple having shanks of comparatively large cross-section subdivided into a plurality of ends reduced at and near the junction, substantially as described.

13. A plurality of thermo-electric couples having their individual elements reduced in cross-section at and near their junction for increasing their sensitiveness, and their cold ends respectively connected to common leads or conductors, substantially as described.

14. A thermo-electric battery comprising a plurality of couples having their elements reduced in cross-section at and near their junctions for causing the several couples to quickly respond to changes in temperature; said couples being arranged in series, substantially as described.

In testimony whereof I have hereunto set my hand in the presence of two subscribing witnesses.

WILLIAM H. BRISTOL.

Witnesses:
A. FABER DU FAUR, Jr.,
RAENA H. YUDIZKY.